March 25, 1969
H. B. LEE
3,434,585
HYDROSTATIC COOKER CONVEYOR
Filed Sept. 15, 1967
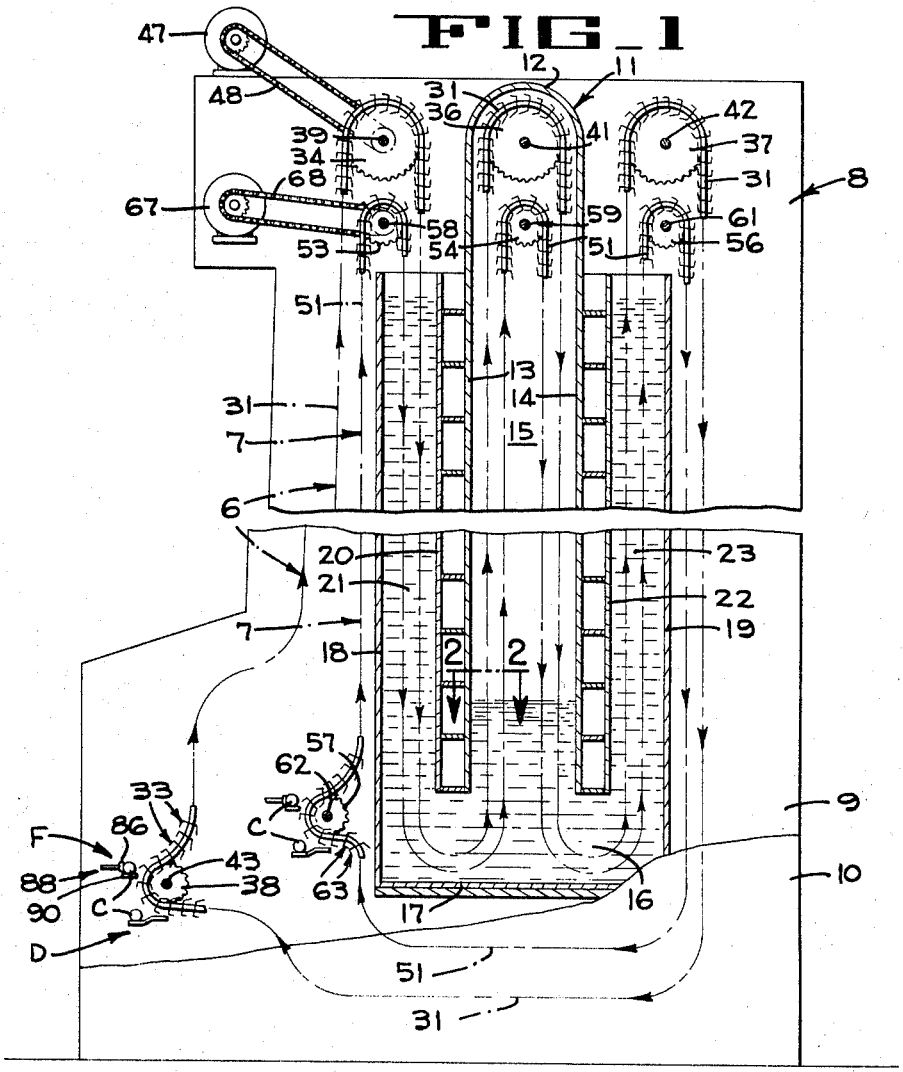
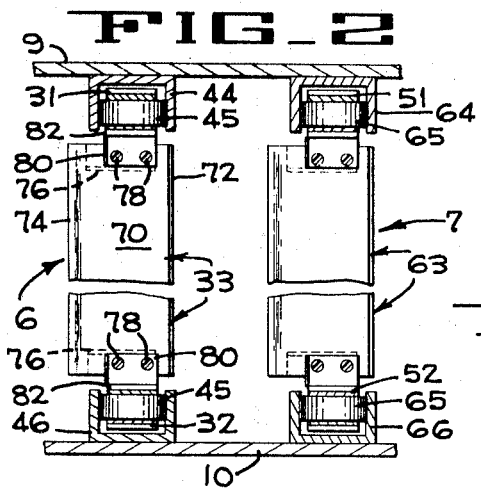
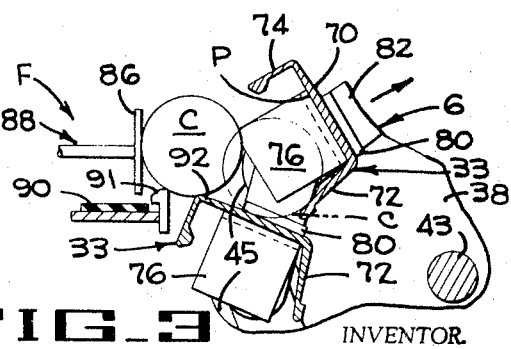
INVENTOR.
HAROLD B. LEE
BY
*Francis W. Anderson*
ATTORNEY

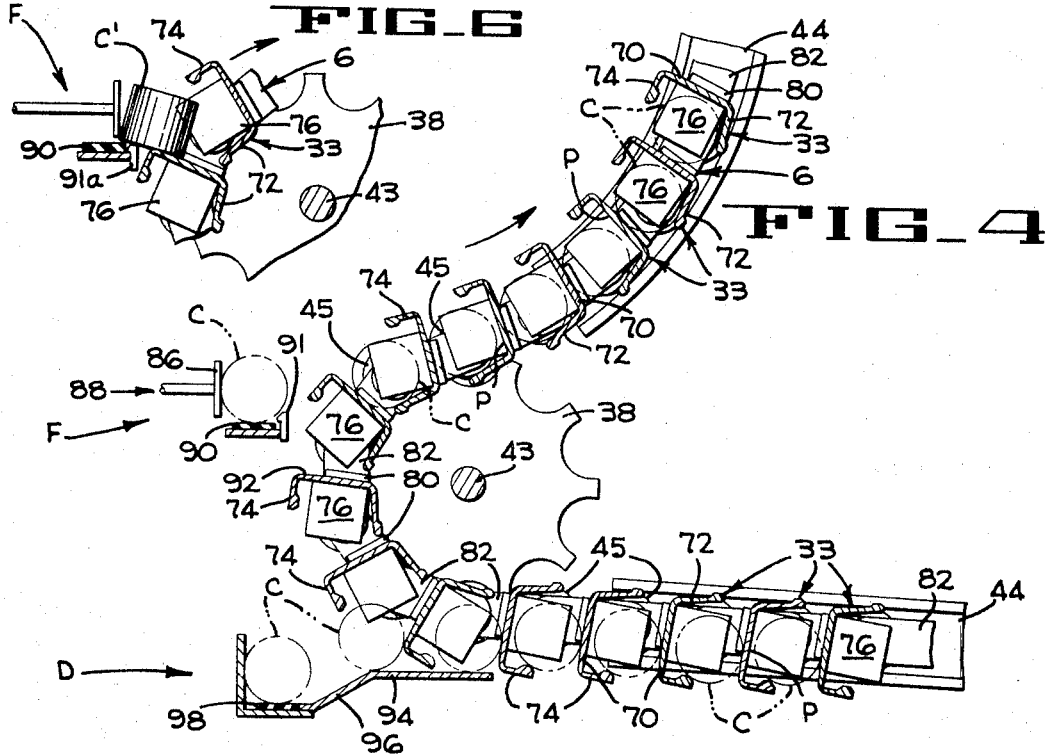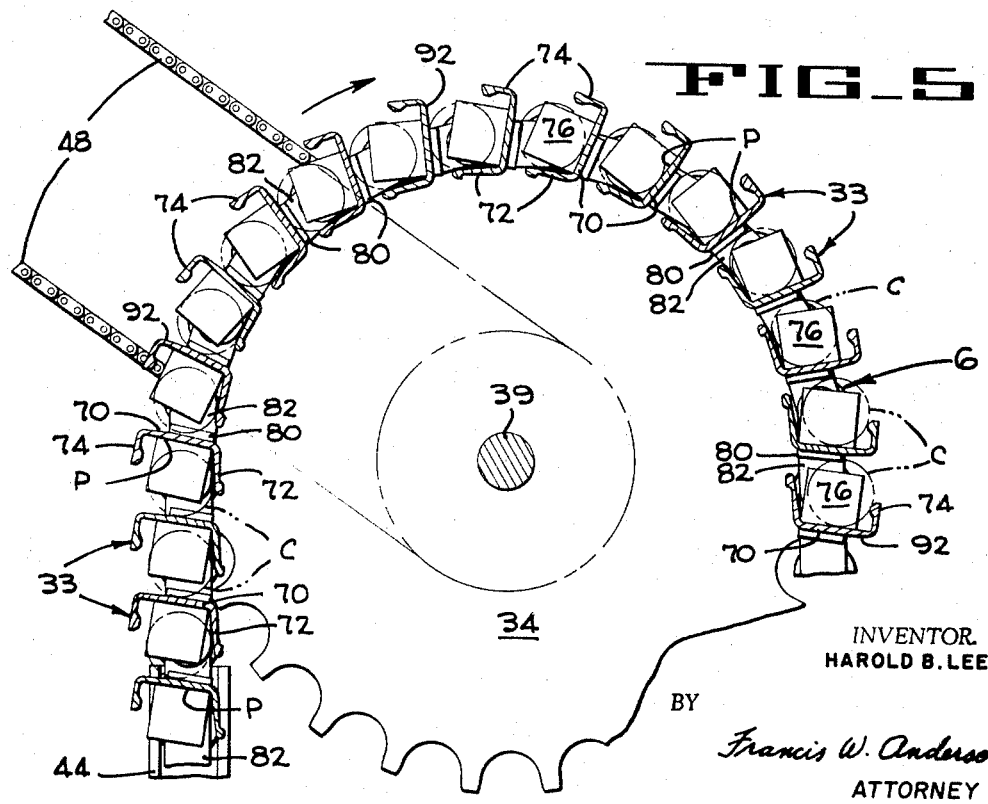

United States Patent Office 3,434,585
Patented Mar. 25, 1969

3,434,585
HYDROSTATIC COOKER CONVEYOR
Harold B. Lee, West Heidelberg, Victoria, Australia, assignor to FMC Corporation, San Jose, Calif., a corporation of Delaware
Filed Sept. 15, 1967, Ser. No. 668,110
Int. Cl. B65g 17/16, 47/40, 47/04
U.S. Cl. 198—131                        8 Claims

ABSTRACT OF THE DISCLOSURE

A hydrostatic cooker conveyor having spaced chains with C-shaped carriers mounted therebetween. Each carrier having a base wall with a short side wall and a long side wall formed integrally on opposite edges thereof and projecting rearwardly relative to the direction of movement of the conveyor. The base wall being mounted on the chain links with the short wall a greater distance from the pitch plane of the chains than the long wall, and with the base wall angled relative to the pitch plane so that the short wall leads the long wall whereby containers fed onto the forward face of the base wall will gravitate against the long wall of the next preceding carrier when moving upwardly in the cooker.

Background of the invention

Generally C-shaped carriers for hydrostatic cookers are well known, however, the known C-shaped carriers have been mounted on the conveyor chains so that their side walls lead, rather than follow, the base wall relative to the direction of movement of the conveyor. However, when the side walls lead the base walls as in the prior art carriers, it has been determined that there is more likelihood of containers, especially containers which are shorter in length than they are in width, from becoming improperly positioned in the associated carrier than containers which are fed onto the unobstructed flat surface of the base wall in accordance with the present invention. The reason for this positioning problem is that a row of containers entering the cavity or pocket within a C-shaped carrier enters over a sharply inclined wall of the carrier, and, accordingly, the containers bounce different amounts when their movement is terminated by contact with the walls of the carrier.

Summary of the invention

The hydrostatic cooker conveyor of the present invention includes a plurality of C-shaped carriers which have the flat relatively unobstructed surfaces of their base walls leading, rather than following, the side walls considered relative to the direction of movement of the conveyor. Furthermore, the base wall is angled slightly downwardly and away from the feed station, relative to the pitch plane of the conveyor, so as to allow cylindrical containers to gently roll onto the unobstructed surface of the base wall and come to rest against the long side wall of the preceding carrier without bouncing off that wall. Because the containers are pushed onto an unobstructed, relatively flat surface of the base wall, short containers supported on their ends rather than on their cylindrical surfaces can easily be fed into and be discharged from the carriers thus adapting the cooker to handle containers supported on their ends as well as containers supported on their cylindrical surfaces in the usual manner.

Brief description of the drawings

FIGURE 1 is a fragmentary diagrammtic vertical central section of a double chain hydrostatic cooker which employs the improved conveyor of the present invention, certain parts being broken away.

FIGURE 2 is an enlarged horizontal section of the conveyor taken along lines 2—2 of FIGURE 1 showing two carriers with their central portions broken away.

FIGURE 3 is an enlarged vertical section at the feed station showing containers on their cylindrical surfaces being pushed into a carrier.

FIGURE 4 is a vertical section illustrating a carrier of one of the conveyors as it discharges a row of containers at a discharge station and further illustrates empty carriers approaching the feed station.

FIGURE 5 is an enlarged vertical section illustrating the position of the containers in the carriers of one of the conveyors as the conveyor moves around one of the upper sprockets.

FIGURE 6 is a view similar to FIGURE 3 illustrating a row of short containers being pushed into one of the carriers.

Description of preferred embodiments

Two of the improved conveyors 6 and 7 (FIG. 1) of the present invention are associated with a hydrostatic cooker 8. The hydrostatic cooker 8 comprises a pair of spaced vertical support walls 9 and 10 suitably supported in upright position. A housing 11, which extends between the walls 9 and 10, has a rounded upper end 12 and two depending walls 13 and 14 which cooperate with the walls 9 and 10 to define a cooking chamber 15 which is filled with a heat treatment medium such as steam at a predetermined cooking pressure and temperature, for example, at 270° F. and 15 p.s.i. gauge. The lower end of the housing 11 opens into a water filled trough 16 which is formed by the walls 9 and 10, a transverse horizontal plate 17, and the lower end portions of two transverse vertical walls 18 and 19. The wall 18 cooperates with another transverse vertical wall 20 to define an inlet hydrostatic water leg 21, and wall 19 cooperates with a transverse vertical wall 22 to provide an outlet hydrostatic water leg 23. The hydrostatic legs 21 and 23 communicate with trough 16 and are filled with water so as to create sufficient pressure to resist the pressure of steam in the cooking chamber 15. The inlet hydrostatic water leg 21 is thermostatically controlled to provide a gradually increasing water temperature from approximately 210° F. at its upper end to approximately 245° F. at its lower end. The outlet water leg 23 is also thermostatically controlled to provide a gradual decrease of water temperature from approximately 245° F. at its lower end to any suitable temperature below the boiling point of water at atmospheric pressure, depending upon the type of containers being handled, at the upper end thereof. Steam is added to the water in the hydrostatic inlet leg 21 to provide the desired heating temperatures therein, and cold water is directed into the outlet or cooling leg 23 to provide the desired cooling temperatures therein.

Rows of containers C to be processed are carried through the cooker by the two separate endless conveyors 6 and 7 (FIGS. 1 and 2). The outer conveyor 6 comprises a pair of endless chains 31 and 32 (FIG. 2) having a plurality of elongated spaced carrier bars 33 mounted therebetween. The chains 31 and 32 are trained around transversely aligned pairs of sprockets 34, 36, 37 and 38 (FIG. 1) which are keyed to shafts 39, 41, 42 and 43, respectively, that are suitably journaled on the side walls 9 and 10. The chains 31 and 32 are guided along tortuous paths by channel tracks 44 and 46 (FIG. 2), respectively, which are secured to the frame of the cooker and are arranged to receive rollers 45 carried by the chains. A motor 47 is connected to the shaft 39 by a chain drive 48 and drives the conveyor 6 in the direction of the arrows on the pitch line as shown in FIGURE 1.

The inner conveyor 7 likewise comprises a pair of endless chains 51 and 52 which are entrained around pairs of transversely aligned sprockets 53, 54, 56 and 57 that are keyed to shafts 58, 59, 61 and 62, respectively, which shafts are journaled in the side walls 9 and 10. A plurality of elongated carriers 63 (FIG. 2) are disposed between and are evenly spaced along the chains 51 and 52 and serve to support rows of containers therebetween. Guide channels 64 and 66 are provided to guide rollers 65 of chains 51 and 52, respectively, along tortuous paths in the direction of arrows indicated in FIGURE 1. The conveyor 7 is driven by a motor 67 which is mounted on the wall 9 and is connected to the shaft 58 by a chain drive 68.

The carriers 33 and 63 of the conveyors 6 and 7, respectively, may be identical in size and shape, as indicated in the drawings, if it is desired to handle only one size range of containers; or the carriers 63 may be larger or smaller than the carriers 33 if it is desired to simultaneously process two separate size ranges of containers. Since the carriers 33 and 63 are similar, only the carriers 33 will be described in detail.

The carriers 33 (FIGS. 2–5) each includes a base wall 70, a long side wall 72 formed integrally with one edge of the base wall and a short side wall 74 formed integrally with the other edge of the base wall. The side walls 72 and 74 trail the base wall 70 relative to the direction of movement of the conveyor 6 as indicated by the arrows on the pitch line or plane of the conveyor 6. The walls 70, 72 and 74 define a container accommodating pocket P each of which is closed from container passage at both ends thereof by angle abutment plates 76. The ends of the base walls 70 of the carriers 33 and the abutment plates 76 are connected to the associated links by carrier mountings. The carrier mountings include bolts 78 which connect the carriers to tabs 80 that are welded to the associated links 82 of the conveyor chains 31 and 32. The tabs 80 are secured to the associated links by any suitable means such as by welding so that the edges thereof nearest the long walls 72 trail the edges nearest the front or short walls 74. Thus, the base wall of each carrier is inclined relative to a transverse plane normal to the pitch plane of the associated links 82 with the leading edge of the short wall preceding the leading edge of the long wall 72. Accordingly, when the conveyor 6 is moving vertically upward, the base wall 70 will be inclined downwardly from the short wall 74 so as to cause the containers to gravitate against the long wall 72 of the next higher or preceding carriers. When moving vertically downward as indicated at the right of FIGURE 5, the containers gravitate toward the short wall 74. Thus, the inclination of the base wall 70 causes the containers to rest against either the short or long walls during vertical movement through the cooker.

As indicated in FIGURE 2, the short wall 74 of each carrier is disposed outwardly of the pitch plane of the conveyor 6 a greater distance than is the long wall 72 from said plane.

In order to feed containers into and discharge containers from the carriers 33 (FIGS. 3 and 4), the conveyor 6 is moved around the sharp curve defined by the sprockets 38 thereby separating the short walls 74 of adjacent carriers a sufficient distance to receive containers at a feed station F and to discharge the containers after they have passed through the cooker at a discharge station D.

It is an important feature of this invention that as each carrier moves past the feed station F (FIG. 3), a horizontal reciprocating pusher 86 of a feed mechanism 88 of standard well known design pushes a row of containers from a feed conveyor 90 over a guide rail 91 onto the unobstructed leading surface 92 of the base wall 70 and allows the containers to come to rest against the long wall 72 of the next preceding carrier, rather than pushing the roll off containers directly into a pocket P of one of the carriers. It will be noted that the containers are transferred when the leading surface 92 moves slightly past a horizontal plane passing through the axis of shaft 43 and that at this time the inclination of the leading surface 92 is relatively shallow, i.e., it is preferably not in excess of about 25° from the horizontal. Thus, there is little tendency for the containers to move against the long wall 72 of the preceding carrier with sufficient force to cause any of the containers to bounce off the wall and change their orientation.

It will also be noted that since the containers move from the relatively flat surface of the feed conveyor 90 to the relative flat unobstructed leading surface 92 of the base wall 70 of the associated carriers, that short containers C' supported on end as indicated in FIGURE 6, rather than on their cylindrical sides as indicated in FIGURE 3, can be transferred into the carriers 33 so that they will be supported in the carriers on end and will not tend to topple from this desired orientation. If containers on end are to be handled, it is apparent that the guide rail 91a (FIG. 6) is not needed and must be removed or lowered as indicated so that the transfer from the conveyor to the carriers will be unobstructed.

After the containers have been loaded into the carriers in the above described manner, they are moved through the processing mediums in the cooker in the usual manner thereby sterilizing and thereafter cooling the contents of the containers.

The processed rows of containers, whether supported on their ends or on their sides, are then advanced into the discharge station D (FIG. 4) and gravitate onto a substantially horizontal slide plate 94. The next following carrier 33 then pushes the containers off the slide plate 94 and onto a sloping plate 96 which causes the containers to gravitate away from the carriers on the conveyor 6 and onto a takeaway conveyor 98 at the discharge station D.

From the foregoing description it will be apparent that the conveyor of the present invention includes a plurality of C-shaped carriers which are mounted on the chains of the conveyor so that the relatively flat unobstructed surfaces of the base walls of each carrier leads, rather than follows, the pocket defining side walls of the carriers. With the base wall of each carrier leading the side walls thereof, containers on end as well as containers on their sides may reliably be fed into the carriers without danger of being disoriented.

Having completed a detailed description of the invention so that those skilled in the art could practice the same, I claim:

1. A conveyor for a cooker of the type wherein the conveyor includes a plurality of carriers, two spaced endless chains guided along a circuitous path in a predetermined direction through the cooker and past a feed station and a discharge station by tracks and cooperating sprockets, each chain being formed by a plurality of links, carrier mountings connecting the carriers to successive links of said chains, means at said feed station for pushing a row of containers onto said carriers, and means at said discharge station for receiving the containers after being processed; the improvement wherein each carrier includes a relatively flat base wall, a long side wall connected to one edge of the base wall, and a short side wall connected to the other edge of said base wall, and wherein said side walls trail the base wall as the base wall moves through the cooker.

2. An apparatus according to claim 1 wherein said carrier mountings connect the carriers to the associated chain links so that the leading surface of the base wall is inclined downwardly and toward said long side wall when the conveyor is moving the carriers vertically upward.

3. An apparatus according to claim 1 wherein said carrier mountings connect each carrier to the associated chain links so that said short wall is spaced outwardly from the pitch plane of said links a greater distance than is said long wall.

4. An apparatus according to claim 2 wherein said carrier mountings connect each carrier to the associated chain links so that said short wall is spaced outwardly from the pitch plane of said links a greater distance than is said long wall.

5. An apparatus according to claim 3 wherein a pair of small diameter pocket opening sprockets are provided adjacent said feed and discharge stations, and wherein said short walls are positioned radially outward of said long walls when moving past said stations, the diameter of said pocket opening sprockets being such that the narrow walls are spaced a sufficient distance apart to receive containers therein when moving past said feed station and to discharge containers therefrom when moving past said discharge station.

6. An apparatus according to claim 5 wherein containers are moved by said feed means onto the substantially flat leading surface of the base walls of each carrier as the carriers move past said feed station.

7. An apparatus according to claim 6 wherein containers supported on their ends are pushed by said feed means onto said flat leading surface of the base wall of a carrier as the carrier moves past said feed station.

8. An apparatus according to claim 6 wherein cylindrical containers supported on their cylindrical surfaces are pushed by said feed means transversely onto said flat leading surface of the base wall of a carrier as the carrier moves past said feed station, and wherein the transverse movement of the cylindrical containers is terminated by said long side wall of the next preceding carrier.

References Cited

UNITED STATES PATENTS 2,774,460  12/1956  Spoonhour _____ 198—131

EDWARD A. SROKA, *Primary Examiner.*

U.S. Cl. X.R.

198—152